United States Patent [19]
Takemura

[11] Patent Number: 5,674,080
[45] Date of Patent: Oct. 7, 1997

[54] IC CARD INFORMATION PROCESSING APPARATUS

[75] Inventor: Hisao Takemura, Kawasaki, Japan

[73] Assignee: Kabushiki Kaisha Toshiba, Kawasaki, Japan

[21] Appl. No.: 532,107

[22] Filed: Sep. 22, 1995

[30] Foreign Application Priority Data

Sep. 29, 1994 [JP] Japan .................................. 6-235574

[51] Int. Cl.$^6$ .................................................. H01R 13/62
[52] U.S. Cl. ........................................ 439/159; 439/260
[58] Field of Search ......................... 439/152, 159–160, 439/260, 267

[56] References Cited

U.S. PATENT DOCUMENTS

| | | | |
|---|---|---|---|
| 4,874,323 | 10/1989 | Shibano | 439/260 |
| 4,961,710 | 10/1990 | Komatsu | 439/260 |
| 5,000,694 | 3/1991 | Komatsu | 439/260 |
| 5,055,970 | 10/1991 | Weihs | 439/260 |
| 5,440,448 | 8/1995 | Stewart et al. | 439/159 |
| 5,473,505 | 12/1995 | Kessoku et al. | 439/159 |
| 5,513,067 | 4/1996 | Ishihara et al. | 439/160 |

FOREIGN PATENT DOCUMENTS

| | | |
|---|---|---|
| 0 333 530 | 9/1989 | European Pat. Off. |
| 0 348 929 | 1/1990 | European Pat. Off. |
| 0 414 390 A1 | 2/1991 | European Pat. Off. |
| 0 608 814 A1 | 8/1994 | European Pat. Off. |
| 295 05 678.9 | 7/1995 | Germany . |
| 4-38029 | 6/1992 | Japan . |
| 6-131508 | 5/1994 | Japan . |
| 2198595 | 11/1987 | United Kingdom ........ 439/260 |

OTHER PUBLICATIONS

IBM Technical Disclosure Bulletin; vol. 37, No. 02b, Feb. 1994, Armonk NY; pp. 183–184, XP000433804 "PCMCIA Modular Packaging System".

Abstract of Japan vol. 18, No. 376 (P1770), 14 Jul. 1994 & JP-A-06 102967 (Toshiba Corp), 15 Apr. 1994.

Abstract of Japan vol. 18, No. 349 (P1763), 30 Jun. 1994 & JP-A-06 089131 (Seiko Epso Corp), 29 Mar. 1994.

DE-U 29505678(1) (Stocko Metallwarenfabriken Henkels und Sohn GmbH).

Primary Examiner—Neil Abrams
Assistant Examiner—Brian J. Biggi
Attorney, Agent, or Firm—Cushman, Darby & Cushman IP Group of Pillsbury Madison & Sutro LLP

[57] ABSTRACT

A main body has a flat main frame and a base frame which oppose each other at a predetermined interval, and is formed to have a shape and size so as to be inserted in a card slot of a computer. A card storage portion for storing an IC card is defined between the main frame and the base frame. A slider is arranged in the card storage portion, and is pushed and moved by the leading end portion of the inserted IC card. A push-up plate is formed integrally with the slider and arranged to contact the surface of the inserted IC card which is opposite to the surface on which external terminals are arranged. A projection is arranged in the moving path of the push-up plate. When the IC card is inserted to a predetermined position, the push-up plate rides on the projection in an inclined state and pushes the inserted IC card toward contact pins to bring the external terminals of the IC card into contact with the contact pins.

7 Claims, 9 Drawing Sheets

IC CARD INFORMATION PROCESSING APPARATUS

BACKGROUND OF THE INVENTION

1. Field of the Invention

The present invention relates to an IC card information processing apparatus for performing information processing, such as reading or writing information, for an IC card and, more specifically, to an IC card information processing apparatus which is used with an electronic equipment such as a portable personal computer.

2. Description of the Related Art

In recent years, in place of a conventional ID card or a plastic card such as a magnetic stripe card, an IC card capable of storing various information has been popular. Such an IC card comprises an IC chip mounted in the IC card and external terminals exposed to one card surface.

In general, an IC card information processing apparatus for reading/writing information from/in the IC card of this type comprises a card storage portion formed such that the IC card can be inserted in the card storage portion, and contact pins which are brought into contact with the external terminals of the inserted IC card to electrically connect the IC card with the apparatus. A conventional mechanism for performing a contacting/separating operation between the external terminals of the IC card and the contact pins is described in Jpn. Pat. Appln. KOKOKU Publication No. 4-038029, where a mechanism for vertically moving a contact holder holding contact pins is popularly used. More specifically, the contact holder is arranged in the apparatus to be slidable parallel to the IC card in accordance with the insertion of the IC card. While moving in the insertion direction, the contact holder also moves upward toward the IC card, i.e., moves in a direction perpendicular to the insertion direction of the IC card, so that the contact pins are brought into contact with the external terminals of the IC card.

However, when the mechanism for vertically moving the contact holder holding the contact pins is employed, the entire information processing apparatus cannot be easily decreased in thickness. In addition, since the internal structure of the information processing apparatus is complex, the number of parts are increased, and assembling, adjustment, and the like are cumbersome. The manufacturing cost becomes high.

As described above, since the conventional IC card information processing apparatus is relatively thick and has a large size, this apparatus is arranged as an external apparatus. When the IC card information processing apparatus is used while being connected to an electronic equipment such as a host computer, the processing apparatus is connected to an interface connector such as an RS-232C connector arranged in the electronic equipment through a connector cable or the like. In this case, wiring of the cable is cumbersome, a space for installing the IC card information processing apparatus is limited, and the electronic equipment and the processing apparatus has poor portability.

In recent years, for example, a portable personal computer comprises a card slot for receiving a card-like electronic part such as a modem card, or an interface card standardized by, e.g., PCMCIA standards. It is very convenient that an IC card information processing apparatus is used while being loaded in this card slot. Jpn. Pat. Appln. KOKAI Publication No. 6-131508, for example, discloses an IC card information processing apparatus which can be loaded in such a card slot. However, this conventional apparatus also has the above-mentioned construction wherein a contact holder holding contact pins are moved vertically by a shifting mechanism., Thus, this apparatus is complex in the internal structure and it is difficult to assemble the apparatus in a size which can be loaded in the card slot.

SUMMARY OF THE INVENTION

The present invention has been made on the basis of the above circumstances, and has as its object to provide an inexpensive IC card processing apparatus which has a small thickness and a simple internal structure, can be inserted in a card slot standardized and formed in an electronic device, can be used and carried integrally with the electronic equipment, can be used everywhere, has considerably improved utility, and can be easily assembled and adjusted.

In order to achieve the above object, an IC card information processing apparatus according to the present invention is characterized by comprising: a main body having a shape capable of being inserted in a card slot which is formed in an electronic equipment, for loading a card-like electronic part, the main body having a card storage portion for storing an IC card and a card insertion port communicating with the card storage portion; contacts arranged in the main body exposed to card storage portion, and located at positions opposing external terminals of the IC card stored in the card storage portion; and card displacement means arranged in the main body, for displacing the IC card inserted in the card storage portion toward the contacts to bring the external terminals of the IC card into contact with the contacts, in interlock with the insertion of the IC card.

According to the IC card information apparatus having the above arrangement, the IC card inserted in the card storage portion through the insertion port is displaced toward the contacts by the card displacement means arranged in the main body, and the external terminals of the IC card are brought into contact with the contacts. For this reason, the IC card information processing apparatus can be smaller in thickness than a conventional processing apparatus having a mechanism for vertically moving a contact holder holding contacts, and the outer shape of the main body can be made to be loaded in the card slot of an electronic equipment such as a computer. Therefore, the IC card information processing apparatus can be used while being inserted in and connected to the card slot of the electronic equipment, and the IC card information processing apparatus can be used and carried integrally with the electronic equipment. In addition, the IC card information processing apparatus can be used everywhere, and the utility of the processing apparatus can be considerably improved.

Further, the internal structure of the apparatus can be simpler than that of the conventional apparatus. For this reason, the cost can be considerably lowered, and the apparatus can be easily assembled and adjusted. In addition, the apparatus has improved reliability with respect to failure.

By adjusting the setting position and shape of the card displacement means, timing of an arbitrary contact between the contact pins and the external terminal can be adjusted.

According to an IC card information processing apparatus of the present invention, the card displacement means comprises a slider arranged in the card storage portion and movable together with the inserted IC card while being pushed by a leading end portion of the inserted IC card, a push-up plate formed integrally with the slider and overlapping the surface of the IC card which is opposite the surface on which the external terminals of the IC card are arranged, and a projection arranged in a moving path of the push-up plate so that the push-up plate rides on the projection in an inclined state and pushes the IC card toward the contacts when the IC card is inserted to a predetermined position.

According to the apparatus, when the IC card is inserted and the push-up plate is moved to a predetermined position together with the slider, the push-up plate rides on the projection and is inclined to push the IC card toward the contacts. Thus, the external terminals of the IC card are brought into contact with the contacts.

With the above arrangement, the apparatus can be smaller in thickness than a conventional apparatus, and the outer shape of the main body can be set to allow the main body to be inserted in and connected to the card slot of the electronic equipment. Therefore, the apparatus can be used while being inserted in the card slot of the electronic equipment, can be used or carried integrally with the electronic equipment, can be used everywhere, and has considerably improved utility.

In the above arrangement, only the push-up plate and projection are arranged opposite the card storage portion. For this reason, the internal mechanism of the apparatus can be simpler than that of the conventional apparatus. Therefore, manufacturing cost can be considerably lowered, and the apparatus can be easily assembled and adjusted. In addition, the apparatus of the present invention has improved reliability with respect to failure.

According to another IC card information processing apparatus of the present invention, a card displacement means comprises a stationary inclined guide arranged in the card storage portion. The inclined guide is arranged opposite the contacts and inclined to an insertion direction of the IC card such that the inclined guide is closest to the contacts at a position opposing the contacts. The IC card inserted in the card storage portion is guided and displaced by the inclined guide toward the contacts, so that the external terminals of the IC card are brought into contact with the contacts.

The above mentioned IC card information processing apparatus has a simple arrangement in which the inclined guide is arranged in the card storage portion, so that the apparatus can be smaller in thickness than a conventional apparatus having a mechanism for vertically moving a contact holder holding contacts, and the main body can have an outer shape to be inserted in and connected to the card slot of the electronic equipment. In addition, the internal mechanism of the apparatus of the present invention is simpler than that of the conventional apparatus, the cost can be considerably lowered, and the apparatus can be easily assembled and adjusted, and has improved reliability with respect to failure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 7 show an IC card information processing apparatus according to a first embodiment of the present invention, in which:

FIGS. 8 to 11 show an IC card information processing apparatus according to a second embodiment of the present invention, in which:

FIGS. 12 to 15 show an IC card information processing apparatus according to a third embodiment of the present invention, in which:

DETAILED DESCRIPTION OF THE PREFERRED EMBODIMENTS

An IC card information processing apparatus according to a first embodiment of the present invention will be described in detail with reference to FIGS. 1 to 6.

Figure 1:
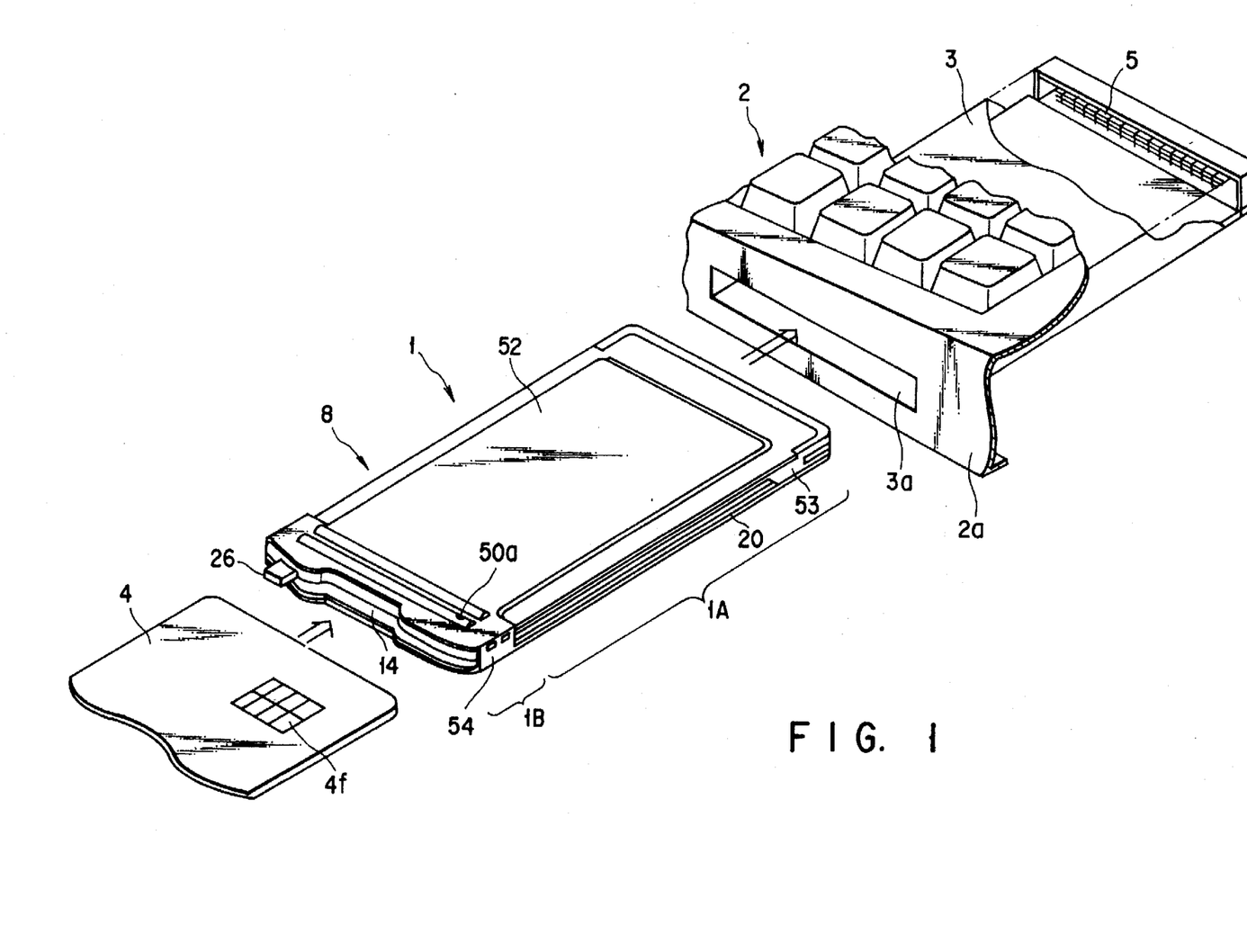
FIG. 1 is a perspective view showing the IC card information processing apparatus, part of an IC card, and part of a personal computer.

FIG. 1 shows an IC card information processing apparatus 1 according to this embodiment, an IC card 4 to be loaded in the apparatus 1 and subjected to information processing, and a laptop personal computer in which the information processing apparatus is to be loaded.

The personal computer 2 comprises a card slot 3 in which a card-like electronic element, e.g., a modem card, an interface card, or the like of the PCMCIA standards, can be selectively loaded. The card slot 3 is formed to have a flat, rectangular shape having a size according to the standards, and the card slot 3 has an insertion opening 3a opened to a side surface 2a of the personal computer 2. In addition, the deep portion of the card slot 3 has a connector 5 to which the card-like electronic element is to be connected.

Like the card slot 3, the IC card 4 is formed to have a flat, rectangular shape having a size according to the predetermined standards. An LSI chip (not shown) is mounted in the IC card 4. External terminals 4f electrically connected to the LSI chip are exposed to one surface, e.g., the upper surface, of the IC card.

The IC card information processing apparatus 1 is formed to have approximately a shape and size complying with the standards of the card-like electronic element. More specifically, the apparatus 1 has a maximum thickness of 5 mm and a width of 54 mm which is equal to the width of the IC card. Thus, the processing apparatus 1 can be loaded into the card slot 3 through the insertion opening 3a. In this embodiment, the processing apparatus 1 comprises a part 1A which is to be inserted in the card slot 3, and a part 1B which projects from the personal computer 2 where the parts A and B are integrated with each other. However, the part 1B may be inserted in the card slot depending on the shape of the card slot 3 of the computer 2.

When the IC card information processing apparatus 1 is inserted into the card slot 3, a connector (to be described later) arranged at the distal end of the processing apparatus is electrically connected to the connector 5 arranged in the card slot 3 of the personal computer 2.

Figure 2:
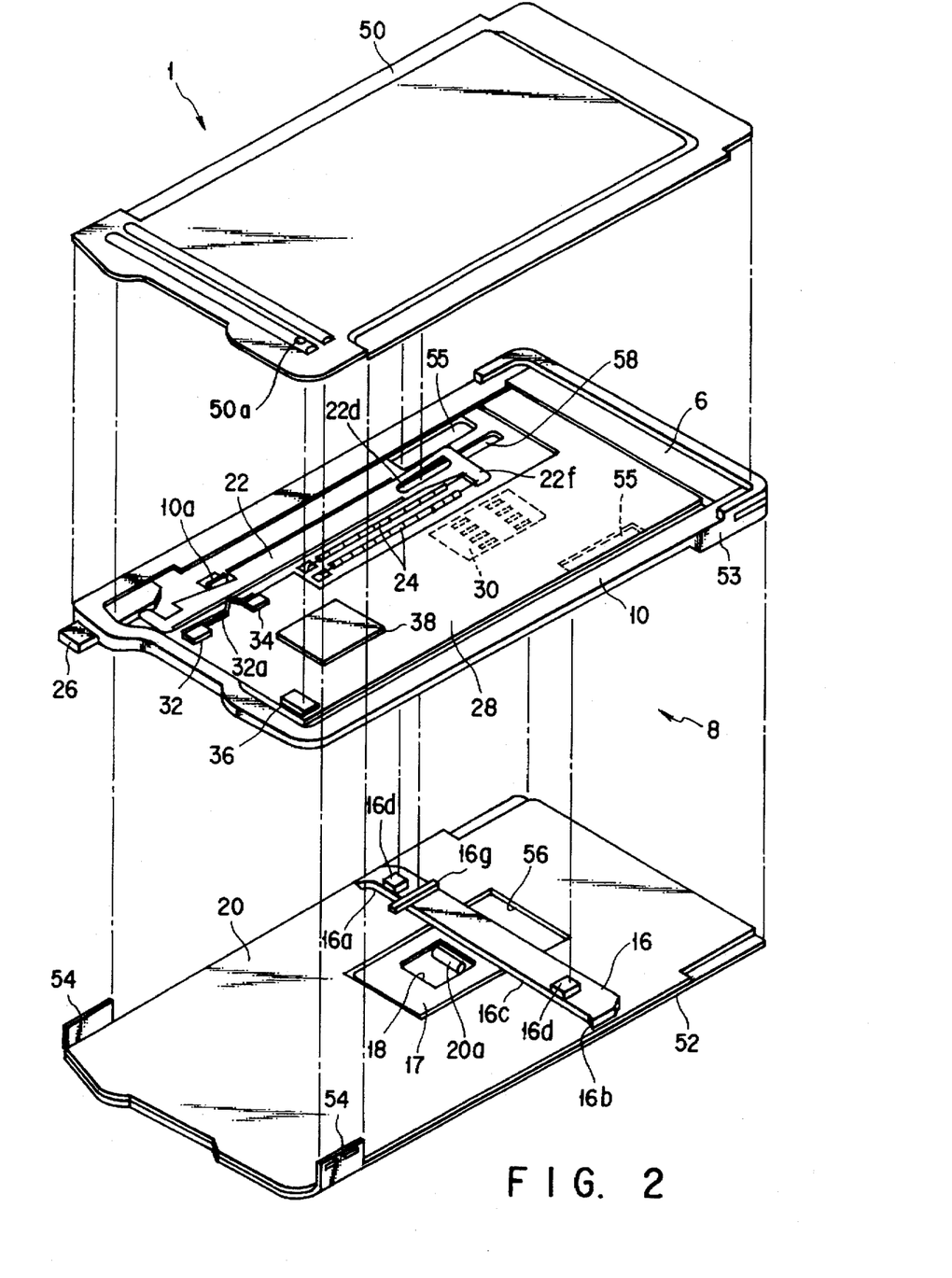
FIG. 2 is an exploded perspective view showing the IC card information processing apparatus.
Figure 3:
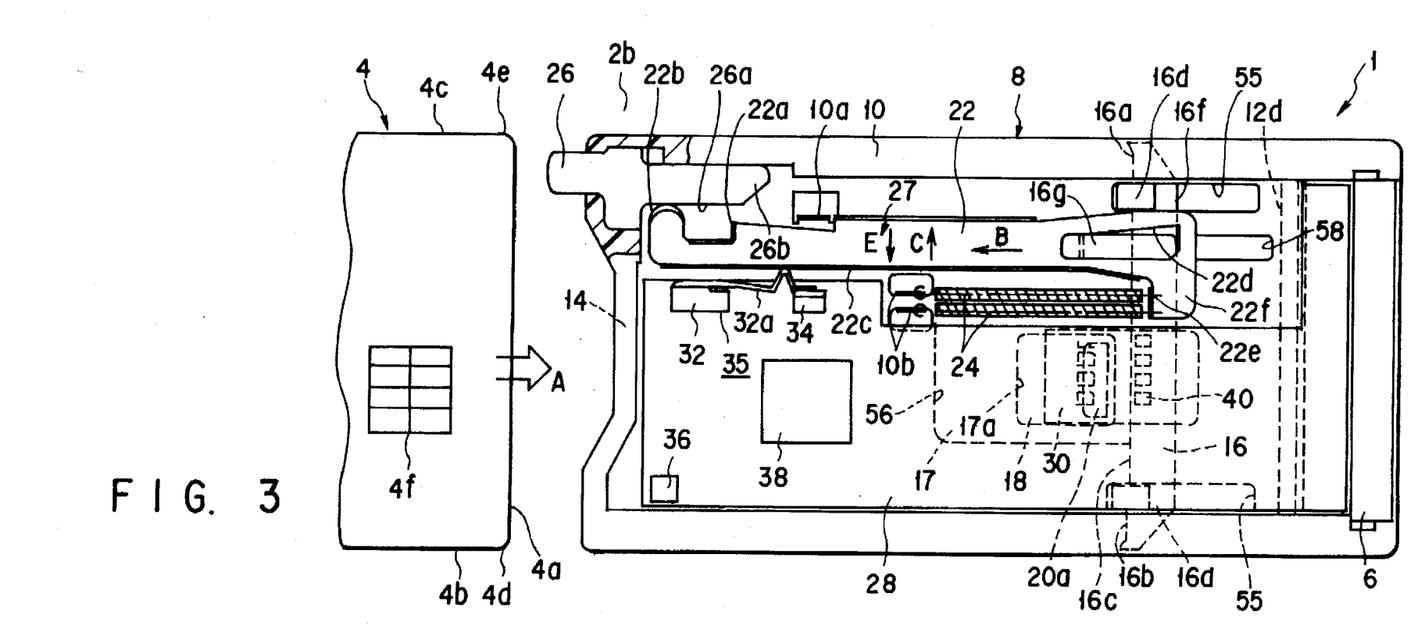
FIG. 3 is a plan view showing a state of the apparatus in which the IC card is not inserted, while a shield cover is removed.

The internal structure of the processing apparatus 1 will be described with reference to FIGS. 1 to 4. Note that FIG. 3 shows the processing apparatus 1 in which the IC card 4 is not inserted and an upper cover of the processing apparatus is removed.

As shown in FIGS. 1 to 4, the IC card information processing apparatus 1 comprises a main body 8. The main body 8 has a main frame 10 formed in a rectangular shape which holds various mechanical members (to be described later), a base frame 20 opposing the main frame 10 with a predetermined gap and formed in a rectangular shape which is almost the same as that of the main frame 10, a first shield cover 50 consisting of a metal which entirely covers the outer surface of the main frame 10, and a second shield cover 52 consisting of a metal which entirely covers the outer surface of the base frame 20.

At one end portion of the main body 8 in the longitudinal direction which serves as a distal end in the insertion direction of the card slot 3 of the personal computer 2, the main frame 10 has a pair of leg portions 53 spaced apart from each other in the widthwise direction of the main body. The pair of leg portions 53 are fixed to the base frame 52. Between the pair of leg portions 53 is arranged an apparatus-side connector 6 which can be connected to the connector arranged in the card slot 3 of the personal computer 2. This apparatus-side connector 6 is interposed between the main frame 10 and the base frame 20, and extends over the almost entire length of the main body 8 in the widthwise direction. In addition, at the other end portion of the main body 8, the second shield cover 52 has a pair of joint portions 54 extending upward from both the side edges of the second shield cover 52, and the extending end of each joint portion is Joined to the first shield cover 50. Therefore, the main frame 10 and the base frame 20 are spaced apart from each other with a predetermined interval and held in parallel to each other, and a card storage portion 15 for storing the IC card 4 is defined between these two frames. A card insertion port 14 for the IC card 4 is open to the other end portion of the main body 8, and the card insertion port 14 communicates with the card storage portion 15.

Figure 4:
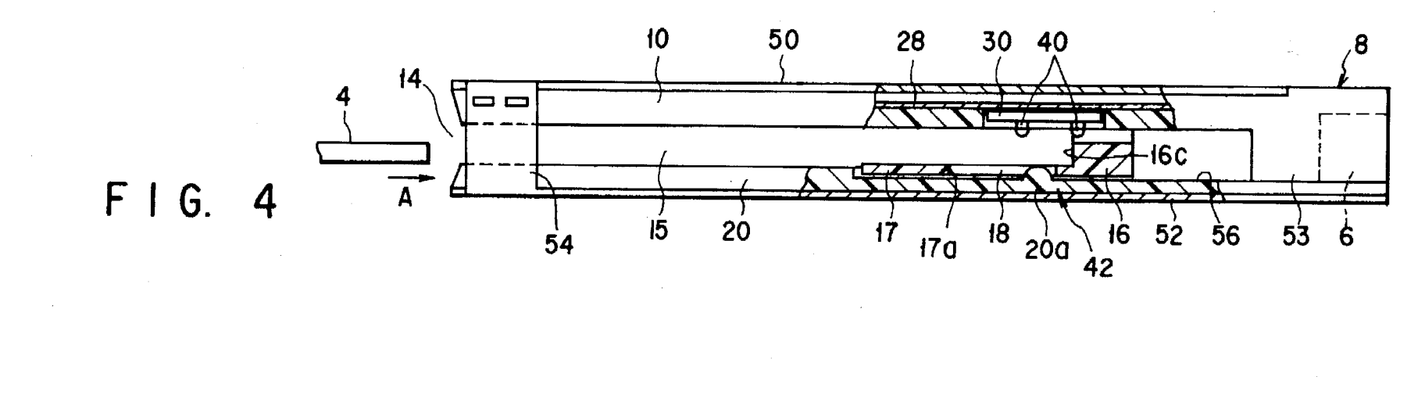
FIG. 4 is a partially cutaway side view showing the apparatus in which the IC card is not inserted.

As is apparent from FIG. 4, in order to smoothly insert/eject the IC card 4, the card insertion port 14 has a large entrance and gradually decreases in size in the insertion direction (direction of an arrow A) of the IC card 4. For example, the size is set to be 54.0 mm to 54.3 mm. When the IC card 4 is to be inserted in the card storage portion 15 through the card insertion port 14, the inner surfaces of the pair of joint portions 54 function as guide surfaces for guiding the side edges 4b and 4c of the IC card 4 in the longitudinal direction.

On the insertion end side of the main body 8 in the card storage portion 15, a slider 16 is arranged slidably in the insertion direction A of the IC card 4. The slider 16 is elongated and extends almost over the entire width of the main body 8.

The slider 16 has arcuate contact surfaces 16a and 16b with which the leading end corner portions 4d and 4e of the IC card 4 are brought into contact, and a flat contact surface 16c with which a leading end surface 4a of the IC card 4 is brought into contact. These contact surfaces are brought into contact with the leading end of the IC card 4 inserted in the card storage portion 15 to position the leading end portion of the IC card 4. Therefore, the IC card 4 inserted from the card insertion port 14 into the card storage portion 15 is positioned in the widthwise direction of the card by the joint portions 54 of the second shield cover 52 near the card insertion port 14, and the leading end of the card is positioned by the arcuate contact surfaces 16a and 16b and the flat contact surface 16c at the deep portion of the card storage portion 15.

The slider 16 has a pair of guide projections 16d projecting toward the main frame 10. These guide projections 16d are slidably engaged with a pair of elongated holes 55 formed in the main frame 10 in the insertion direction A. In this manner, the slider 16 can slide back and forth in the insertion/eject direction A of the IC card 4 within a predetermined range. More specifically, as shown in FIGS. 2 to 4, when the IC card 4 is not inserted in the card storage portion 15, the slider 16 is located at a standby position where it has been moved on the card insertion port 14 side. As will be described later, when the IC card 4 is inserted to a predetermined position in the card storage portion 15, the slider 16 is moved toward the insertion end of the IC card information processing apparatus 1 together with the IC card and located at a pushed-in position shown in FIGS. 5 and 6.

As is apparent from FIGS. 2 and 4, a push-up plate 17 serving as a card displacement member is formed integrally with the slider 16 and extends from the slider 16 toward the card insertion port 14. The push-up plate 17 is stored in an elongated guide groove 56 formed in the base frame 20 and extending in the card insertion direction A, and can be slid in the guide groove 56 in accordance with movement of the slider 16. The push-up plate 17 is formed integrally with the slider 16 by an elastic material such as a synthetic resin, and can be elastically deformed in a direction perpendicular to the upper surface of the base frame 20.

An arcuate projection 20a projects from the bottom of the guide groove 56. A rectangular through hole 18 having a size which is large enough to store the projection 20a is formed in the push-up plate 17. As shown in FIGS. 2 and 4, when the IC card 4 is not inserted, the projection 20a is located in the through hole 18, and the push-up plate 17 is horizontally set in the guide groove 56 and level with the upper surface of the base frame 20. For this reason, when the IC card 4 is inserted, the card 4 is located on the push-up plate 17 and the push-up plate 17 pushes on the that surface (lower surface of the IC card 4 in FIG. 4) of the card 4 which is opposite the surface (upper surface) on which the external terminals 4f are formed.

Figure 6:
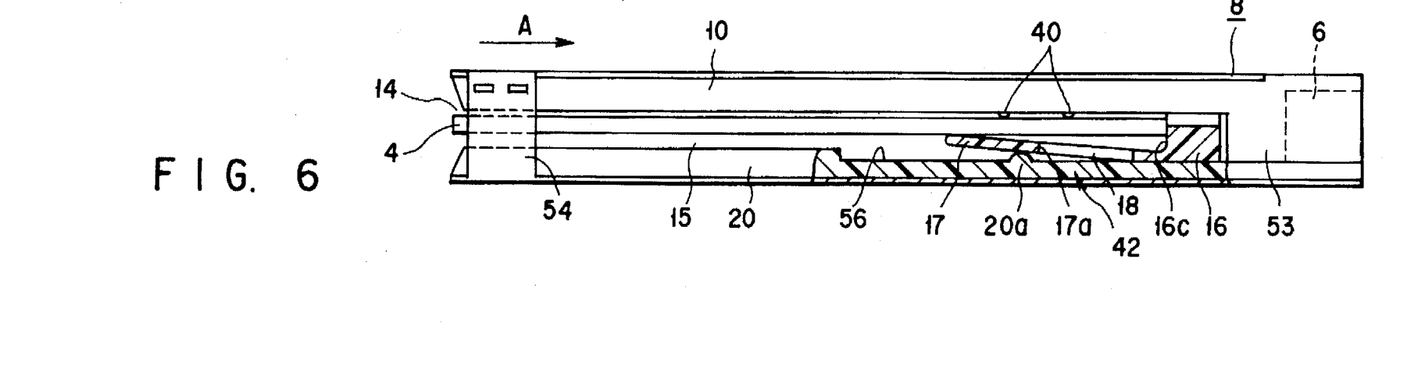
FIG. 6 is a partially cutaway side view showing the apparatus in which the IC card is inserted.

As shown in FIG. 6, when the IC card 4 is inserted to a predetermined position in the card storage portion 15, and the slider 16 is moved to the pushed-in position together with the push-up plate 17, the through hole 18 is shifted away from the position at which the projection 20a is formed, and the push-up plate 17 rides on the top the projection 20a in an inclined state. Therefore, the push-up plate 17 is elastically deformed toward the main frame 10 by the projection 20a and displaces the IC card 4 toward contact pins 40 (to be described later), thereby bringing the external terminals 4f of the IC card 4 into contact with the contact pins 40. The push-up plate 17 and the projection 20a constitute an IC card displacement mechanism 42 serving as card displacement means.

As shown in FIGS. 2 to 4, an elongated plate-like arm 22 extending in the insertion direction A of the IC card 4 is slidably disposed on the upper surface of the main frame 10. An engagement hole 22d is formed in the distal end portion (right end portion) of the arm 22 serving as an engagement member. The engagement hole 22d is located to overlap an elongated guide hole 58 formed in the main frame 10 in the insertion direction A.

An engagement projection 16g projects from the slider 16 and is engaged with the engagement hole 22d of the arm 22 through the guide groove 58 of the main frame 10. For this reason, the arm 22 can be moved together with the slider 16 in the insertion direction A. The engagement hole 22d of the arm 22 is formed into a fan-like shape having one wide end such that the arm 22 can be pivoted about the engagement projection 16g in the clockwise direction (direction of an arrow C).

An arm portion 22f having a spring hook 22e extends from the distal end portion of the arm 22, in which the engagement hole 22d is formed. A pair of tension springs 24 serving as biasing means is stretched between the spring hook 22e and a spring hook portion 10b formed on the main frame 10b, and extends in the insertion direction A. The tension springs 24 bias the arm 22 and the slider 16 joined to the arm 22 in a direction (direction of an arrow B) opposing the insertion direction A of the IC card 4, and always bias the arm 22 around the engagement projection 16g in the clockwise direction (direction of an arrow C).

An eject button 26 serving as an IC card discharge member is arranged at an end portion of the main frame 10 on the card insertion port 14 side. The eject button 26 is arranged slidably on the upper surface of the main frame 10 in the card insertion direction A, and can be operated from outside the main body 8. As shown in FIG. 3, when the IC card 4 is not inserted in the card storage portion 15, a projection abutment portion 22b provided at the other end (left end) of the arm 22 abuts against a projection abutment surface 26a of the eject button 26. As a result, the arm 22 is prevented from being pivoted in the clockwise direction C, and is held at an initial position.

Figure 5:
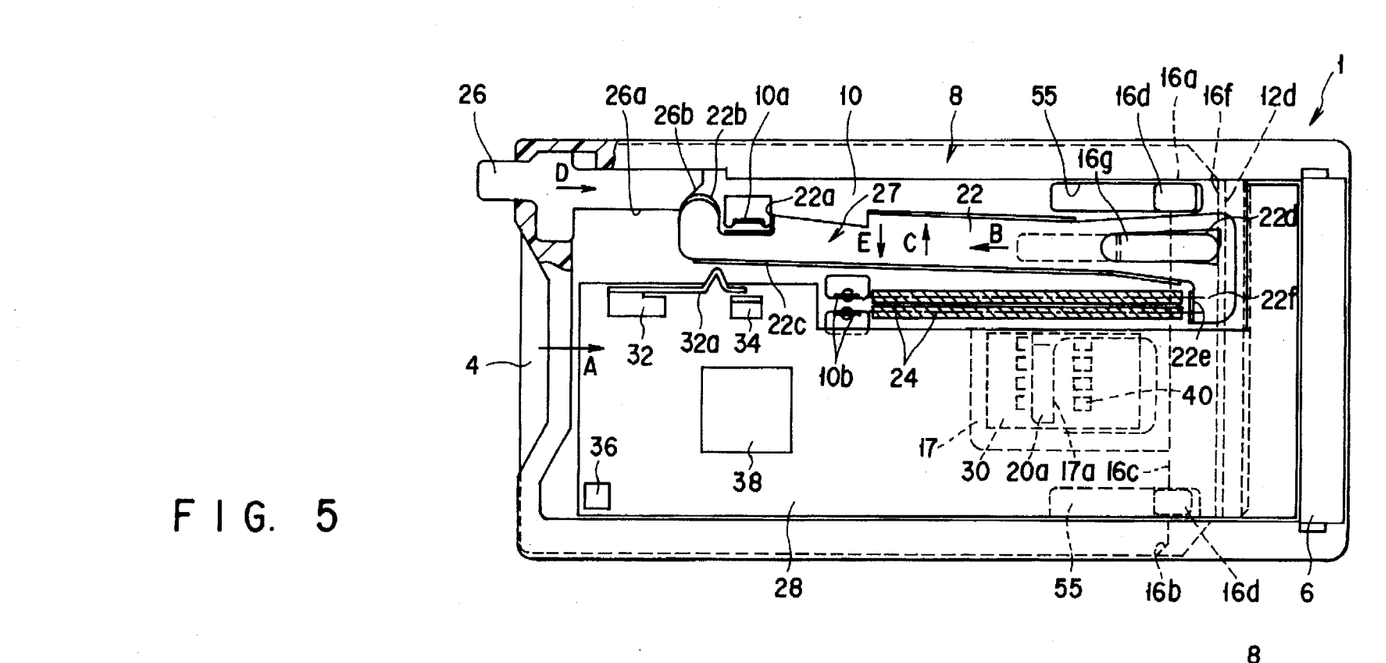
FIG. 5 is a plan view showing a state of the apparatus in which the IC card is inserted when the shield cover is removed.

When the IC card 4 is inserted in the card storage portion 15, as shown in FIG. 5, the projection abutment portion 22b at the left end of the arm 22 is released from the projection abutment surface 26a of the eject button 26, and the arm 22 is pivoted to a pivot position (FIG. 5) in the clockwise direction C. A notched portion 22a formed in the arm 22 and serving as an engagement portion is engaged with a partially cut raised portion 10a formed in the main frame 10 and serving as an engaging portion. For this reason, the arm 22 is prevented from moving in the direction of the arrow B, and is held at a pushed-in position together with the slider 16. The partially cut raised portion 10a and the notched portion 22a constitute a slider lock mechanism 27 serving as slider lock means for holding the arm 22 and the slider 16 joined to the arm 22 against the biasing force of the tension springs 24.

A control board 28 is arranged on the upper surface of the main frame 10. This control board 28 is connected to the connector 6 for connecting the control board 28 to the computer 2. On the control board 28 are arranged a contact holder 30 which holds pin-like contacts 40 (to be referred to as contact pins hereinafter) consisting of a conductive elastic material to be connected to the external terminals 4f of the IC card 4, first and second switches 32 and 34 serving as detection means 35 for detecting motion of the arm 22, a light source (LED) 36 which is turned on while information is read from and written on the IC card 4, and a large-scale integrated circuit (LSI) 38 serving as control means. Note that a through hole 50a is formed in the first shield cover 50 to oppose the light source (LED) 36, so that an ON/OFF state of the LED 36 can be visually recognized from outside the IC card information processing apparatus 1 through the through hole 50a.

The contact holder 30 is mounted on the rear surface (lower surface) of the control board 28 and arranged at a position opposite the push-up plate 17 of the slider 16. The distal ends of the 8 or 6 contact pins 40 held in the contact holder 30 extend through pin insertion holes (not shown) formed in the main frame 10 and project from the lower surface of the main frame 10 into the card storage portion 15.

The first and second switches 32 and 34 are arranged adjacent to the arm 22. The first switch 32 has a contact portion 32a extending toward the second switch 34 which consists of a conductive elastic material. When the IC card 4 is not inserted, and the arm 22 is located at the initial position, the contact portion 32a is pushed by an end face 22c of the arm 22 in tight contact with the second switch 34, as shown in FIG. 3. When the IC card 4 is inserted and the arm 22 is pivoted in the clockwise direction (direction of the arrow C) to the pivot position, the contact portion 32a of the first switch 32 restores the original shape to release from to its second switch 34, as shown in FIG. 5.

The eject button 26 is also used as a lock cancellation member for canceling the locking operation of the slider lock mechanism 27. More specifically, the distal end of the eject button 26 has a tapered guide surface 26b which is to be brought into contact with the projection abutment portion 22b of the arm 22. When the eject button 26 is pushed in the same direction (direction of an arrow D) as the insertion direction A of the IC card 4, the arm 22 is pushed by the tapered guide surface 26b and pivoted in the counterclockwise direction (direction of an arrow E) against the biasing force of the tension springs 24. In this case, the notched portion 22a of the arm 22 is disengaged from the partially cut raised portion 10a formed in the main frame 10. In this manner, the locking of the slider 16 is released, and the slider 16 is moved by the biasing force of the tension springs 24 in the direction of the arrow B opposing the insertion direction A of the IC card 4, thereby ejecting the IC card 4 toward the card insertion port 14.

The operation of the first embodiment arranged described above will be described.

Figure 7:
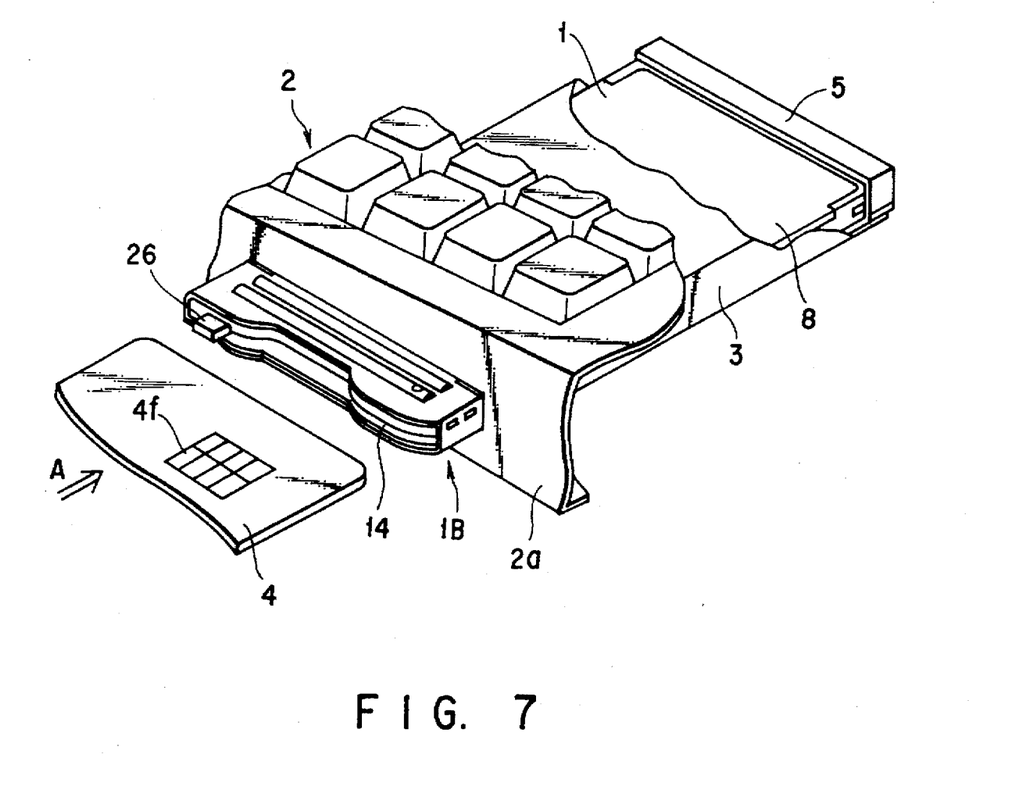
FIG. 7 is a perspective view showing a state wherein the apparatus is inserted in the card slot of the personal computer.

As shown in FIG. 7, the main body 8 of the IC card information processing apparatus 1 is inserted in the card slot 3 of the personal computer 2 through the insertion opening 3a, and the apparatus-side connector 6 arranged at the insertion end of the main body 8 is connected to the connector 5 of the computer 2. In this manner, the IC card information processing apparatus 1 is electrically connected to the personal computer 2. When the processing apparatus 1 is inserted in the card slot 3, the part 1B of the main body 8 projects from the side surface 2a of the computer 2.

Subsequently, the IC card 4 in which read or write access is to be performed is inserted in the card insertion port 14 of the main body 8 in the card insertion direction A. The inserted IC card 4 moves in the direction of depth (direction of an arrow A) in the card storage portion 15 while being guided to a predetermined position by the joint portions 54 of the shield cover 52. The IC card 4 passes over the upper surface of the push-up plate 17 constituting the IC card displacement mechanism 42, the leading end surface 4a of the IC card 4 abuts against the flat contact surface 16c of the slider 16, and both the leading end corner portions 4d and 4e abut against the arcuate contact surfaces 16a and 16b of the slider 16, respectively. In this manner, IC card 4 is positioned. The slider 16 is pushed by the IC card 4 and moves together with the IC card 4 against the tension springs 24.

As shown in FIGS. 5 and 6, when the slider 16 is moved to a given position, an opening end face 17a (shown on the left side in FIGS. 5 and 6) of the through hole 18 formed in the push-up plate 17 abuts against the projection 20a extending from the base frame 20, and the left portion of the push-up plate 17. Which consists consisting of an elastic synthetic resin or the like, with respect to the through hole 18 rides on the projection 20a. Thus, the push-up plate 17 is interposed between the base frame 20 and the IC card 4 to be inclined and bent such that the left end serves as an inclined upper end. The IC card 4 is elastically pushed upward by a restoration force generated when the state of the push-up plate 17 returns to the original state.

The projection 20a for displacing the push-up plate 17 is located immediately below a position at which the contact pins 40 are arranged. For this reason, the external terminals 4f of the IC card 4 elastically pushed upward by the push-up plate 17, which are inclined and ride on the projection 20a, are reliably kept in contact with the contact pins 40. Since the projection 20a is located immediately below the position at which the contact pins 40 are arranged, the timing of contact between the external terminals 4f of the IC card 4 and the contact pins 40 can be freely adjusted by adjusting the shape or position of the projection 20a.

As described above, when the external terminals 4f of the IC card 4 are kept in contact with the contact pins 40, as shown in FIG. 5, an abutment surface 16f at an end face of the slider 16 on a moving direction side (right side) is brought into contact with an abutment surface 12d serving as a part of the main frame 10, and the slider 16 is no longer moved and is held at the pushed-in position. Thus, the IC card 4 is prevented from excessively moving in the insertion direction A. When the slider 16 moves in the insertion direction A of the IC card 4, the arm 22 joined to the slider 16 moves in the insertion direction of the IC card 4 together with the slider 16. At this time, the arm 22 is biased by the biasing force of the tension springs 24 in the clockwise direction (direction of the arrow C). However, the projection abutment portion 22b is brought into contact with the projection abutment surface 26a of the eject button 26, the arm 22 moves while rubbing the projection abutment surface 26a, and the arm 22 is prevented from moving clockwise direction C.

At a position where the projection abutment surface 26a of the eject button 26 ends, the projection abutment portion 22b of the arm 22 moves along the tapered guide surface 26b of the eject button 26, and the arm 22 is pivoted to the pivot position in the clockwise direction C. Accordingly, as shown in FIG. 5, the notched portion 22a formed in the arm 22 is engaged with the partially cut raised portion 10d formed in the main frame 10, and the arm 22 and the slider 16 joined to the arm 22 are prevented from moving in the direction B toward the card insertion port 14. In this manner, the IC card 4 is held at an access position.

As described above, when the arm 22 is pivoted in the clockwise direction (direction of the arrow C), the state of the contact portion 32a of the first switch 32 pressed by the end face 22c of the arm 22 returns to the original state, and the contact portion 32a is released from the second switch 34. In this manner, detection signals are output from the first and second switches 32 and 34, and it is detected that the IC card 4 is reliably inserted to a predetermined position. Access to the IC card can be started by the detection signals.

After the arm 22 is pivoted as described above, i.e., after the notched portion 22a of the arm 22 is engaged with the partially cut raised portion 10a of the main frame 10, it is checked whether the IC card 4 is inserted. For this reason, this time difference makes it possible to start access to the IC card 4 without destroying information in the IC card 4.

An operation of ejecting the IC card 4 from the IC card information processing apparatus 1 will be described.

Upon completion of an operation of reading/writing information in the IC card 4, the LED 36 in an ON state is turned off. After the OFF state of the LED 36 is recognized through the through hole 50a, or after the completion is confirmed by an application system for driving the IC card information processing apparatus 1, the eject button 26 is pushed in the right direction (direction of the arrow D) and the IC card 4 is ejected.

More specifically, as shown in FIG. 5, when the eject button 26 is pushed in the direction D, the projection abutment portion 22b of the arm 22 which is in contact with the tapered guide surface 26b of the eject button 26 is pushed outside, and the arm 22 begins to pivot in the counterclockwise direction (direction of the arrow E). The notched portion 22a of the arm 22 is disengaged from the partially cut raised portion 10a of the main frame 10, and the arm 22 moves in the direction (direction of the arrow B) toward the card insertion port 14. At the same time, the slider 16 joined to the arm 22 moves in the direction B from the pushed-in position to the standby position while being held by the main frame 10.

When the arm 22 is pivoted in the counterclockwise direction (direction of the arrow E) as described above, the end face 22c of the arm 22 pushes the contact portion 32a of the first switch 32 against the second switch 34. Before the arm 22 and the slider 16 joined to the arm 22 move in the left direction, i.e., before the IC card 4 is ejected, the LSI 38 detects that an eject operation is started, in response to signals from the first and second switches 32 and 34.

As described above, since the LSI 38 detects the start of the eject operation before the IC card 4 is ejected, the LSI 38 can store information in processing immediately after the start is detected, and the IC card 4 can be ejected without destroying the information in the IC card 4. Even if the eject button 26 is pushed during access, therefore, the IC card 4 can be safely, reliably ejected without destroying the IC card 4.

When the slider 16 moves to the standby position in the left direction, the IC card 4 is pushed back such that the trailing end portion of the IC card 4 projects from the card insertion port 14, thereby completing the eject operation. Thereafter, when the IC card 4 is manually removed from the card insertion port 14, the IC card information processing apparatus 1 returns into a state in which the IC card 4 is not inserted in the IC card information processing apparatus 1.

According to the IC card information processing apparatus 1 arranged as described above, the IC card 4 inserted in the card storage portion 15 is displaced toward the contacts 40 by the push-up plate 17 serving as a card displacement member arranged in the main body 8, and the external terminals 4f are brought into contact with the contacts 40. For this reason, the thickness of the main body 8 can be smaller than that of a conventional apparatus comprising a mechanism for vertically moving the contact holder holding the contacts, and the shape and size of the main body can be set such that the main body can be inserted in the card slot 3. Therefore, the IC card information processing apparatus 1 can be used while inserted in the card slot 3 of the personal computer 2, so that the apparatus 1 can be used and carried together with the computer 2. As a result, the apparatus 1 can be used everywhere, and the utility of the apparatus can be considerably improved.

The internal mechanism of this apparatus is simpler than that of a conventional apparatus. For this reason, the manufacturing cost of the apparatus can be lowered, assembling, adjustment, and the like of the apparatus can be easily performed, and reliability with respect to a failure can be improved. In addition, when the position and the shape of the card displacement member is changed, the timing of contact between the contact pins 40 and the IC card 4 can be arbitrarily adjusted.

When the IC card is inserted to a position at which information processing can be performed, the arm 22 having the notched portion 22a engaged with the engaged portion of the main frame 10 is coupled to the slider 16 which is moved by being pushed by the leading end portion of the IC card 4, and the first and second switches 32 and 34 for detecting motion of the arm 22 are arranged. For this reason, the detecting operation of the first and second switches 32 and 34 can check whether the IC card 4 is held at a position where information processing can be performed. Therefore, information in the IC card can be reliably prevented from being destroyed by an erroneous operation.

FIGS. 8 to 11 show an IC card information processing apparatus according to a second embodiment of the present invention. The second embodiment is different from the first embodiment in the arrangement of an IC card displacement mechanism 42 for pushing an inserted IC card 4 toward contact pins 40. The remaining arrangement of the second embodiment is the same as that of the first embodiment. The same reference numerals as in the first embodiment denote the same parts in the second embodiment, and a detailed description thereof will be omitted.

Figure 8:
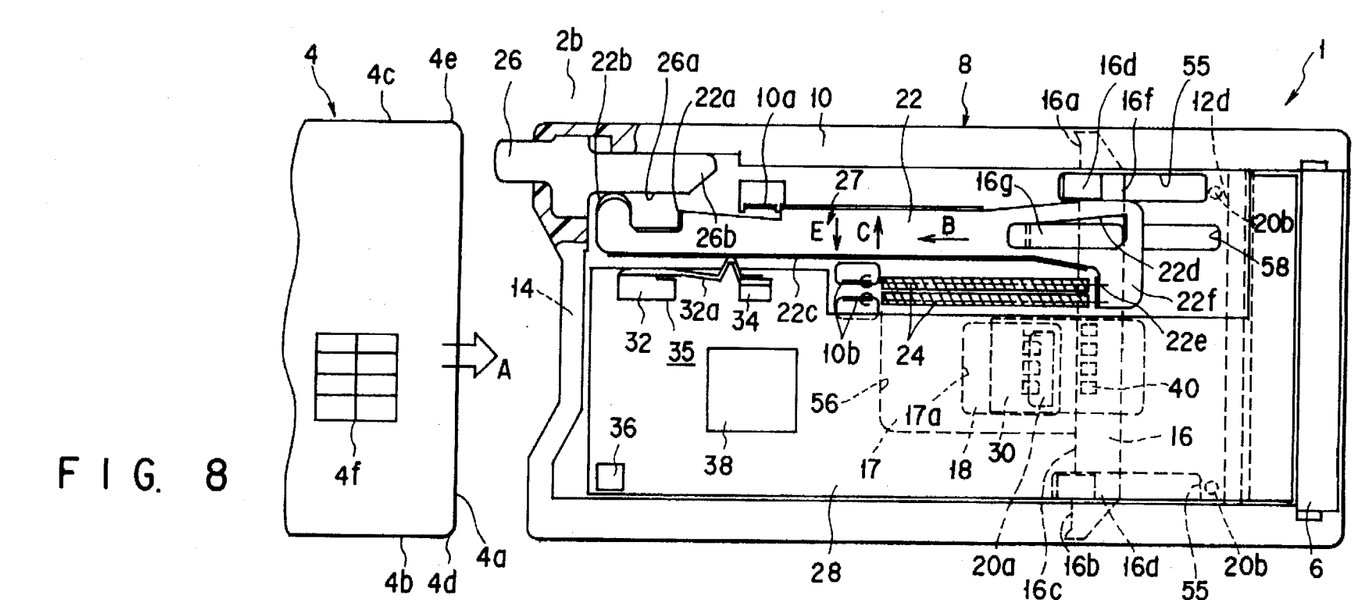
FIG. 8 is a plan view showing of the apparatus in a state wherein the IC card is not inserted, while a shield cover is removed.
Figure 9:
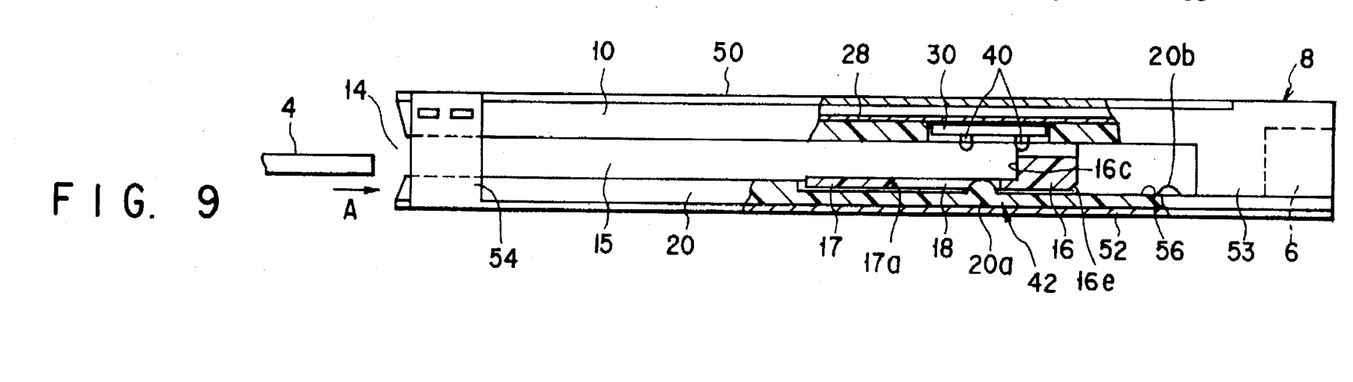
FIG. 9 is a partially cutaway side view showing the apparatus in which the IC card is not inserted.

As shown in FIGS. 8 and 9, the IC card displacement mechanism 42 comprises a projection 20a functioning as a first projection and a pair of second projections 20b. The projection 20a is arranged and positioned as in the first embodiment. More specifically, the projection 20a projects from the bottom surface of a guide groove 56 formed in a base frame 20, and is arranged such that the projection 20a can be stored in a through hole 18 of a push-up plate 17. The second projections 20b are arranged at a position on the upper surface of the base frame 20 to oppose a slider 16 when the slider 16 moves to a pushed-in position. More specifically, the second projections 20b are arranged such that both end portions in the widthwise direction of the slider 16 ride on the second projections 20b, respectively, when the slider 16 moves to the pushed-in position. Note that a leading edge 16e of the slider 16 is chamfered such that the slider 16 easily rides on the second projections 20b.

Figure 10:
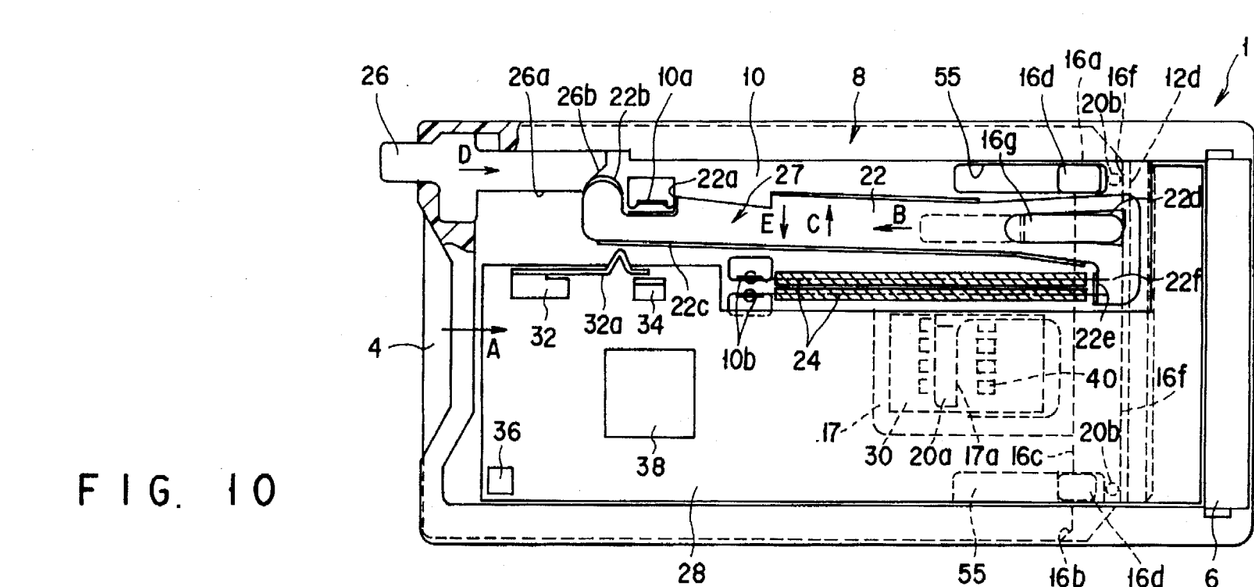
FIG. 10 is a plan view showing the apparatus in a state in which the IC card is inserted, while the shield cover is removed.
Figure 11:
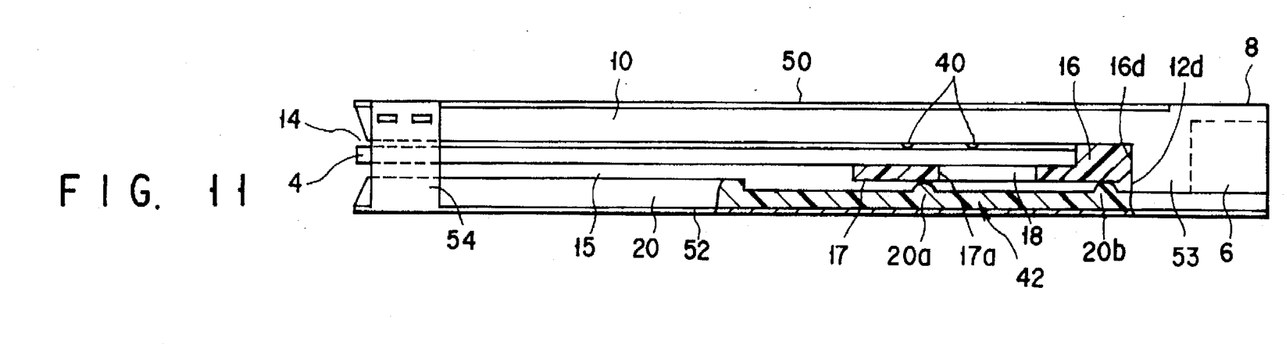
FIG. 11 is a partially cutaway side view showing the apparatus in which the IC card is inserted.

As shown in FIGS. 10 and 11, when the IC card 4 is inserted in a card storage portion 15 through a card insertion port 14, the slider 16 moves from a standby position to the pushed-in position together with the IC card 4. When the slider 16 moves to a given position, an opening edge 17a which defines the left edge of the through hole 18 formed in the push-up plate 17 abuts against the first projection 20a, and the left portion of the push-up plate 17 with respect to the through hole 18 rides on the first projection 20a. At the same time, the leading edge 16e of the slider 16 abuts against the two second projections 20b, and the slider 16 rides on the second projections 20b. In this manner, the push-up plate 17 is lifted toward the contact pins 40 while the push-up plate 17 is kept horizontal, i.e., in parallel to the base frame 20.

The first projection 20a for displacing the push-up plate 17 is located immediately below the position at which the contact pins 40 are arranged, and the second projections 20b are located at a position near a connector 6 of the base frame 20. Therefore, the IC card 4 is pushed upward by the push-up plate 17 and lifted upward by the projections 20a and 20b. As a result, external terminals 4f of the IC card 4 are reliably kept in contact with the contact pins 40.

In the second embodiment arranged as described above, the same function and effect as those in the first embodiment can be obtained. According to the second embodiment, the push-up plate is parallel to the IC card, and the IC card is supported by the surface of the push-up plate. For this reason, a stabler support state can be obtained. Therefore, the contact state between the external terminals of the IC card and the contacts is stabilized, and preferable information processing can be stably performed.

FIGS. 12 to 15 show an IC card information processing apparatus according to a third embodiment of the present invention. The third embodiment is different from the first embodiment in the arrangement of an IC card displacement mechanism 42 for pushing an inserted IC card toward contact pins 40. The remaining arrangement of the third embodiment is the same as that of the first embodiment. The same reference numerals as in the first embodiment denote the same parts in the third embodiment, and a detailed description thereof will be omitted.

Figure 12:
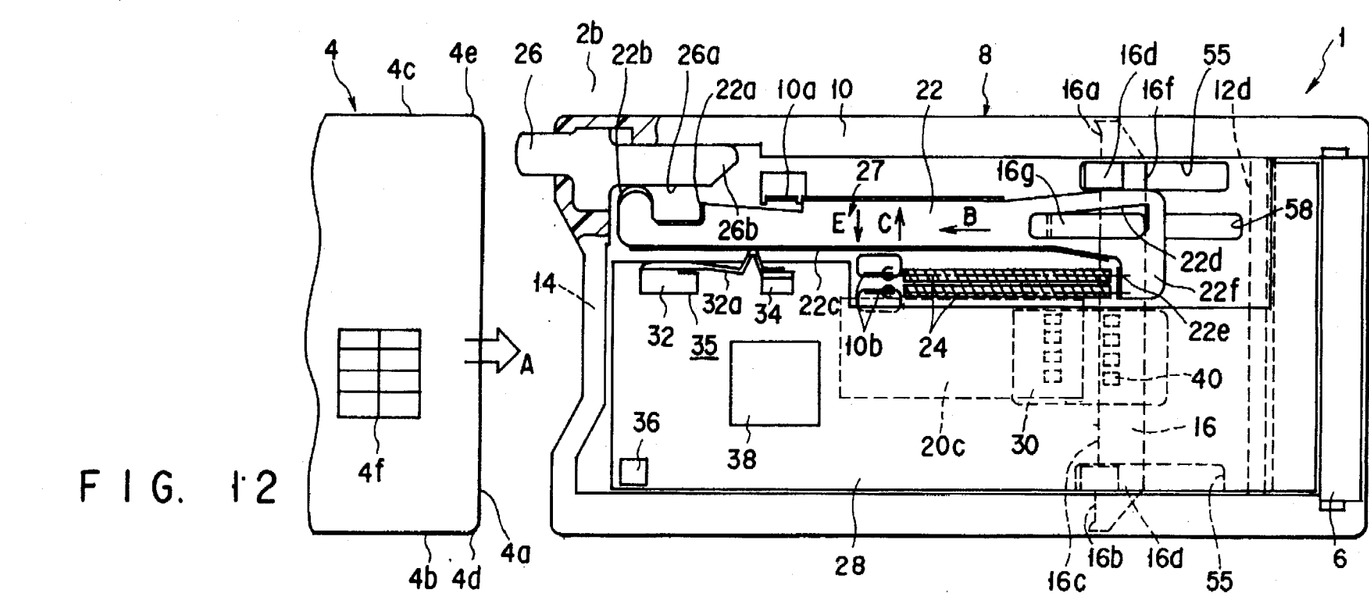
FIG. 12 is a plan view showing the apparatus in a state wherein the IC card is inserted, while a shield cover is removed.
Figure 13:
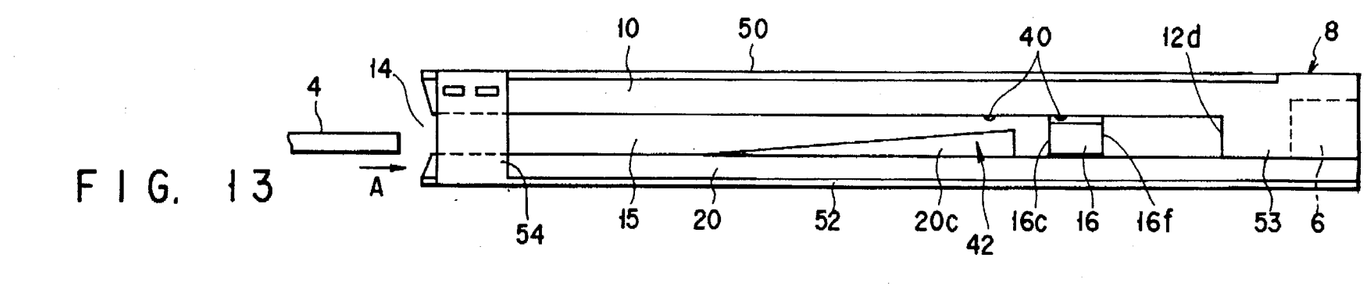
FIG. 13 is a partially cutaway side view showing the apparatus in which the IC card is not inserted.
Figure 14:
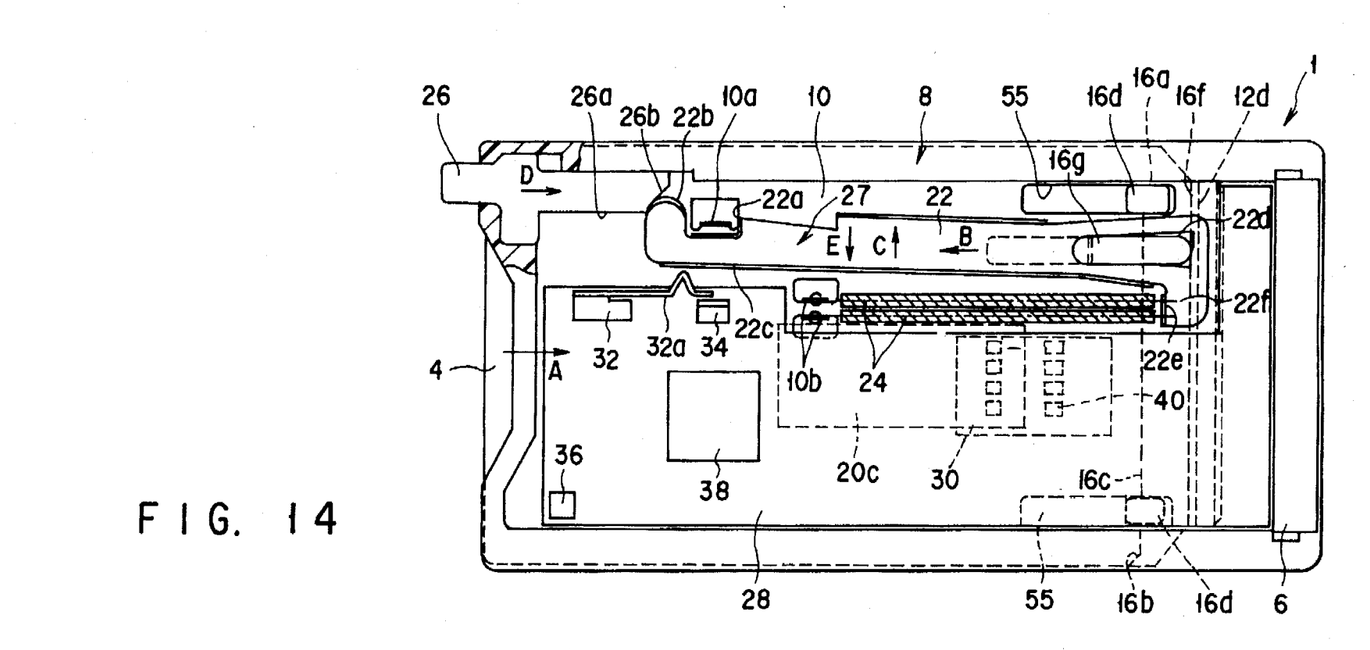
FIG. 14 is a plan view showing the apparatus in a state wherein the IC card is inserted, while the shield cover is removed.
Figure 15:
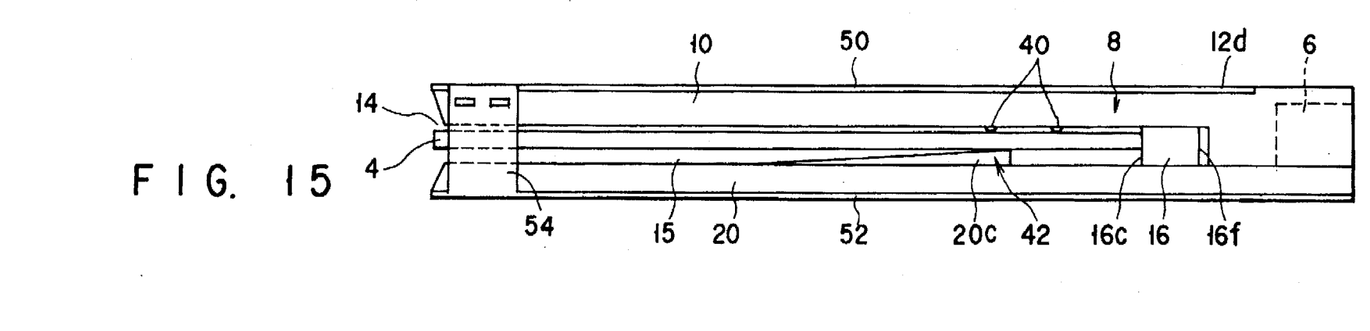
FIG. 15 is a partially cutaway side view showing the apparatus in which the IC card is inserted.

As shown in FIGS. 12 and 13, the IC card displacement mechanism 42 comprises an inclined guide 20c serving as card displacement means formed on the upper surface of a base frame 20. The inclined guide 20c is arranged at a position closer to a card insertion port 14 than a position at which a slider 16 is arranged, and at an almost central portion of a main body 8 in the widthwise direction thereof. The inclined guide 20c is inclined such that its height gradually increases from the card insertion port 14 to the slider 16, i.e., such that the inclined guide 20c gradually comes close to a main frame 10 in a card insertion direction A. The inclined guide 20c is the closest to the main frame 10 near the contact pins 40. A push-up plate 17 for the slider 16 is omitted.

As shown in FIGS. 10 and 11, when the IC card 4 is inserted in a card storage portion 15 through the card insertion port 14, the IC card 4 moves in the card storage portion 15 in the insertion direction A. The IC card 4 is pushed in the card storage portion 15 while being gradually lifted upward by the upper surface of the inclined guide 20c toward the main frame 10, and the IC card 4 passes through the gap between the inclined upper end of the inclined guide 20c and the lower surface of the main frame 10. In addition, the leading end of the IC card 4 abuts against the slider 16, and the slider 16 moves together with the IC card 4 against the biasing force of tensile springs 24.

The inclined upper end of the inclined guide 20c is located immediately below the contact pins 40. For this reason, when the IC card 4 is pushed in the card storage portion 15 to cause the slider 16 to reach a pushed-in position, external terminals 4f of the IC card 4 lifted upward are reliably kept in contact with the contact pins 40. Note that, by adjusting the shape or position of the inclined guide 20c, the timing of contact between the external terminals 4f of the IC card 4 and the contact pins 40 can be freely changed.

In the third embodiment arranged described above, the same function and effect as those in the first embodiment can be obtained. According to the third embodiment, since the inclined guide is only arranged in the card storage portion, the internal mechanism of the third embodiment can be simpler than that of prior art. For this reason, the manufacturing cost can be lowered, assembling, adjustment, and the like can be easily performed, and reliability with respect to a failure can be improved.

In addition, by adjusting the angle of the inclined guide, the timing of contact can be easily and arbitrarily adjusted.

The present invention is not limited to the above mentioned embodiments, and various changes and modifications of the present invention can be effected without departing from the spirit and scope of the present invention. For example, an electronic equipment in which the apparatus of the present invention is fitted is not limited to the above mentioned portable personal computer, and the apparatus can be applied to another electronic equipment such as a desk-top computer and the like.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An IC card information processing apparatus for performing information processing for an IC card having an exposed external terminal on one surface of the IC card, the apparatus comprising:

a main body shaped to fit inside a card slot formed in an electronic equipment for receiving a card-like electronic device, the main body having a card storage portion for storing the IC card when the IC card is inserted in a predetermined insertion direction and a card insertion port communicating with the card storage portion, the main body including first and second flat frames opposite and substantially parallel to each other at a predetermined interval to define the card storage portion therebetween;

a contact which is fixed to the first frame, exposed to the card storage portion and located at a position opposite the external terminal of the IC card inserted in the card storage portion;

a slider arranged in the card storage portion to be moveable in the insertion direction of the IC card between a standby position when the IC card is not inserted in the card storage portion and a pushed-in position when the IC card is inserted in the card storage portion to a predetermined position where the external terminal of the IC card opposes the contact, wherein the slider is pushed by the IC card inserted in the card storage portion to move interlockingly with the IC card and wherein the slider has a push-up plate arranged between the inserted IC card and the second frame; and a card displacement member having a projection portion formed on the second frame in a moving path of the push-up plate opposite the contact so that the moving push-up plate rides on the projection portion to displace the IC card toward the first frame, the push-up plate having a through hole for storing the projection portion when the slider is located at the standby position.

2. An apparatus according to claim 1, wherein the card displacement member has a second projection portion, arranged on the second frame, for pushing up the slider toward the first frame when the slider moves to the pushed-in position.

3. An apparatus according to claim 1 further comprising:

biasing means for biasing the slider toward the card insertion port;

lock means for locking the slider in a predetermined position wherein the external terminal of the inserted IC card is opposite the contact, the lock means having an engagement member coupled to the slider and arranged on the main body to be movable integrally with the slider, a first engagement portion provided on the engagement member, and a second engagement portion provided on the main body, for engaging the first engagement portion when the slider is moved to said predetermined position; and detection means arranged to oppose a moving path of the engagement member, for detecting the movement of the engagement member.

4. An IC card information processing apparatus for performing information processing for an IC card having an exposed external terminal on one surface of the IC card, the apparatus comprising:

a main body having a shape insertable in a card slot formed in an electronic equipment for receiving a card-like electronic device, the main body having a card storage portion for storing the IC card inserted in a predetermined insertion direction and a card insertion port communicating with the card storage portion;

a contact arranged in the main body exposed to the card storage portion and located at a position opposite the external terminal of the IC card inserted in the card storage portion;

a slider arranged in the card storage portion, the slider being moveable in the insertion direction of the IC card, wherein the slider is pushed by the IC card inserted in the card storage portion to move interlockingly with the IC card;

a card displacement member arranged in the main body for displacing the interlocked slider and IC card to bring the external terminal of the IC card into contact with the contact;

an engagement member joined to the slider and arranged in the main body to be moveable integrally with the slider, the engagement member arranged on the main body to be pivotable between a pivoted position where the first engagement portion can engage the second engagement portion and an initial position where the first engagement portion is spaced apart from the second engagement portion,;

biasing means for biasing the slider toward the card insertion point;

lock means for locking the engagement member in a predetermined position at which the external terminal of the inserted IC card comes in contact with the contact, the lock means having a first engagement portion arranged on the engagement member and a second engagement portion arranged on the main body for engaging the first engagement portion when the engagement member is moved to said predetermined position; and detection means arranged to oppose a moving path of the engagement member for detecting the movement of the engagement member, the detection means including a switch having a contact portion which can be switched by a pivot operation of the engagement member between the initial position and the pivoted position.

5. An apparatus according to claim 4 further comprising an eject button arranged on the main body, for releasing the lock of the engagement member performed by the lock means.

6. An apparatus according to claim 4, wherein the slider has a push-up plate arranged to push against the surface of the inserted IC card which is opposite to the surface on which the external terminal is arranged, and wherein the card displacement member has a projection provided in a moving path of the push-up plate upon which the push-up plate rides in an inclined state to displace the IC card toward the contact when the IC card is inserted to a predetermined position.

7. An apparatus according to claim 4, wherein the slider has a push-up plate arranged to push against the surface of the IC card which is opposite to the surface on which the external terminal is arranged, and wherein the card displacement member has a plurality of projections provided in a moving path of the slider and push-up plate upon which the push-up plate and the slider ride in parallel with the IC card to displace the IC card toward the contact when the IC card is inserted to a predetermined position.

* * * * *